United States Patent [19]
Blinn et al.

[11] Patent Number: 6,061,677
[45] Date of Patent: May 9, 2000

[54] DATABASE QUERY SYSTEM AND METHOD

[75] Inventors: Arnold N. Blinn, Clyde Hill; Michael S. Lorton, Redmond, both of Wash.

[73] Assignee: Microsoft Corporation, Redmond, Wash.

[21] Appl. No.: 08/871,079

[22] Filed: Jun. 9, 1997

[51] Int. Cl.[7] .................................................. G06F 17/30
[52] U.S. Cl. .................................... 707/3; 707/2; 707/10
[58] Field of Search ....................................... 707/3, 2, 10

[56] References Cited

U.S. PATENT DOCUMENTS

| | | | |
|---|---|---|---|
| 4,956,774 | 9/1990 | Shibamiya et al. ..................... | 364/200 |
| 5,398,338 | 3/1995 | Yoshida ................................... | 395/600 |
| 5,440,732 | 8/1995 | Lomet et al. ............................ | 395/600 |
| 5,485,607 | 1/1996 | Lomet et al. ............................ | 395/600 |
| 5,515,531 | 5/1996 | Fujowara et al. ............................ | 707/3 |
| 5,542,087 | 7/1996 | Neimat et al. .......................... | 395/600 |
| 5,664,172 | 9/1997 | Antoshenkov .............................. | 707/4 |
| 5,701,467 | 12/1997 | Freeston ................................. | 707/100 |
| 5,758,353 | 5/1998 | Marquis ................................... | 707/201 |

FOREIGN PATENT DOCUMENTS 0 294 583 A2  2/1988  European Pat. Off. .

OTHER PUBLICATIONS

IBM Technical Disclosure Bulletin, "Directional Key support for closed boundary checking", vol. 37, No. 07, pp. 489–491, Jul. 1994.

Primary Examiner—Anton W. Fetting
Assistant Examiner—Jean M. Corrielus
Attorney, Agent, or Firm—Lee & Hayes, PLLC

[57] ABSTRACT

The invention includes an information retrieval system having a server and a plurality of clients. The server has access to one or more data storage media on which the server maintains a database. The database has a plurality of records that can be searched based on key values. The server maintains a page definition table in addition to the database. The page definition table has a plurality of entries, each indicating pairs of key values. To perform an information search, a client submits a search value to the server. The server responds by identifying an entry from the page definition table that corresponds to the search value. The server then identifies a set of database records whose key values are bounded by the pair of key values of the identified entry. Data from these database records are returned as search results to the client.

16 Claims, 2 Drawing Sheets

DATABASE QUERY SYSTEM AND METHOD

TECHNICAL FIELD

This invention relates to methods of searching and browsing databases using remote clients.

BACKGROUND OF THE INVENTION

A large database application will typically support a feature whereby a user may enter a search key that only approximates the actual value for which the user is searching. Frequently, this is done using a "wildcard" character such as "*". The "*" character represents all possible character strings. Accordingly, a search for "jon*" will retrieve any values beginning with the string "jon" followed by any other string of characters. "Jon", "Jones", and "Jonathan" would all be retrieved as a result of using "jon*" as a search key.

The advantages of this search method are that it is flexible, easy to explain to users, and easy to implement. However, the method is somewhat limited. For example, if the values returned from a search do not contain the value sought, there is no obvious way to expand or modify the query to find "nearby" values. In addition, this method allows users to unwittingly or maliciously submit overly broad queries—queries so broad that an unacceptably large portion of the database is returned. For example, a user might type a query such as "a*", which would return all values starting with "a".

Now that databases are increasingly being queried over the Internet, it is becoming even more important to return search results to users in relatively small portions. Some service providers indeed provide search results in measured lengths. For example, only the first 20 hits of a search might be returned, and the user given the option of then requesting the next 20 hits. However, such service providers often initiate a completely new search when the next 20 hits are requested, and then select the second group of 20 hits from the results. This is because of the impracticality of maintaining state information at the server for the thousands of users that might be accessing a database at any given time. Hence a query that returns many sorted rows would be executed completely for each request to the server. This consumes a significant amount of server resources, for searching, sorting, and transmitting data to the client.

The prior art includes a database lookup scheme that addresses these problems to some degree. In accordance with this prior art scheme, two tables were maintained in addition to the actual database. A first table had a plurality of rows, each corresponding to an individual set of data records. Each row contained fields for three values: a first value, a last value, and an ID. The first and last values defined sets or pages of data, similarly to the index entries at the top of a telephone directory or dictionary. A data page corresponding to a particular table entry would include data values in the range between the first value and the last value, inclusive. This data page was placed in another table that was pre-generated.

Consider, as an example, a database of last names as follows:

Ableson Ahlquist Applegate Ashley Bachrnann Bailey Bangsberg Barker Barnes Baxter Beaver Becker Beckett Bergquist Beutel Bezanson Blackwell Boldman Borgman Bowman Bratsanos Braum Brown Burghardt Butler Cantwell Carlstrom Carolan Caudill Chen Cheng Chung Conway Crawford Cunneely Cutler Davidson Davies Davis Day De Donato DeBragga DeBroeck DeNike Dosch Douglas Doyle Drage Driscoll Dugan Dulfer Duncan Dunkelberger Dunn Durham Edwards Elder Ellis Evans Ewing Fang Fay Ferguson Ferris Ferry Fine Fitzgibbons Flippin Flowers Fort Francoeur Freeman Funaro Galasyn Garrity Gilroy Goodman Gordon Gower Grady Gui Guo Gwertzman Harbin Harkness Hart Hartill Haygood Heflin Helfrich Hersey Hogan Honeycutt Hornstein Hunter Huse Jackson Jewiss Jones Joyner Kearney Kelly Kelnhofer King Kinsella Kramer Kreider Labyak Lalonde Laurie Lee Leptich Lim Lindell Livingston Loggins Lorenzana Lowe Ludden Lutz Lyons Maccalman Maes Mah Mahoney Malugen Martin Mastan Maumas Maxey Mc Mahon McCann McCrory McDaniel McGuire Mercure Meyers Miao Milford Miller Moffitt Monberg Moncure Monroe Mooney Moore Morrison Murray Naroski Newton O'Connor O'Sullivan Oker Packham Perabo Peters Phan Pipkins Plamondon Prekeges Prets Quach Raines Ranch Rather Reid Reynolds Rice Richardson Rivera Roberts Robinson Rodrigues Rutledge Saunders Shamblin Simmons Simpson Slonsky Spahn St. Clair Stulz Sturm Sturms Teply Theivagt Thomson Tierney Timoney Titus Troupe Tucker Tutt Twyman Tyner Utzschneider Vaile Visintainer Walker Ward Watson Webb Webb Whitaker White Wilcher Williams Wilson Wolff Yenne Younkin A corresponding table (referred to as a page definition table) might appear as shown in Table 1 below:

TABLE 1

| FIRST | LAST | ID |
|---|---|---|
| Ableson | Baxter | 0 |
| Beaver | Bowman | 1 |
| Bratsanos | Chen | 2 |
| Cheng | Day | 3 |
| De Donato | Dugan | 4 |
| Dulfer | Ewing | 5 |
| Fang | Fort | 6 |
| Francoeur | Grady | 7 |
| Gui | Helfrich | 8 |
| Hersey | Joyner | 9 |
| Kearney | Laurie | 10 |
| Lee | Lutz | 11 |
| Lyons | Maxey | 12 |
| McMahon | Miller | 13 |
| Moffit | Newton | 14 |
| O'Conner | Prekeges | 15 |
| Prets | Rivers | 16 |
| Roberts | Spahn | 17 |
| St. Clair | Titus | 18 |
| Troupe | Ward | 19 |
| Watson | Younkin | 20 |

In accordance with this table, an information page having ID 0 (page 0) would include 10 names, beginning with "Ableson" and ending with "Baxter." Page 1 would have the next 10 names, beginning with "Beaver" and ending with "Bowman." The page definition table was created so that each page had an approximately equal number of names.

A second table was also maintained. This table had actual data from the database, arranged by ID number. In the example, such a table (referred to as a page data table) would have appeared as follows:

TABLE 2

| ID | PAGEDATA |
|----|----------|
| 0  | Ableson . . . Baxter |
| 1  | Beaver . . . Bowman |
| 2  | Bratsanos . . . Chen |
| 3  | Cheng . . . Day |
| 4  | De Donato . . . Dugan |
| 5  | Dulfer . . . Ewing |
| 6  | Fang . . . Fort |
| 7  | Francoeur . . . Grady |
| 8  | Gui . . . Helfrich |
| 9  | Hersey . . . Joyner |
| 10 | Kearney . . . Laurie |
| 11 | Lee . . . Lutz |
| 12 | Lyons . . . Maxey |
| 13 | McMahon . . . Miller |
| 14 | Moffit . . . Newton |
| 15 | O'Conner . . . Prekeges |
| 16 | Prets . . . Rivers |
| 17 | Roberts . . . Spahn |
| 18 | St. Clair. . . Titus |
| 19 | Troupe . . . Ward |
| 20 | Watson . . . Younkin |

The ID value of this table corresponded to the ID value of the page definition table (Table 1). The PAGEDATA values comprised the actual data that was to be returned to a user for particular page, taken from the database. In the example here, the data consists merely of the names themselves. In actual applications, other data might also have been included, such as telephone numbers or addresses.

To perform a search under this scheme, a user would enter the beginning portion of a name, or some string that the user believed approximated the name. Suppose, for example, that the user entered "fle" as a search string. This string would be used to query Table 1, to find the ID for a row spanning the search string. Using SQL format, the search might appear as follows:

select ID from page_definition_table where

FIRST≤'fle' and LAST≥'fle' where "page_definition_table" refers to Table 1.

In this case, 6 would have been the appropriate ID, indicating that page 6 should be returned to the user. To find the appropriate data, a second query would have been performed against Table 2 using the ID number identified in the first search. An SQL query to accomplish this might have appeared as follows:

select PAGEDATA from page_data_table where ID==X where where "page_data_table" refers to Table 2 and X is the ID value returned from the first query. The PAGEDATA value would have been returned to the user, along with the ID value. Using the ID value, the user would have been able to browse to previous and subsequent pages by submitting a query against Table 2 using a decremented or incremented ID.

There were several serious problems with this scheme. One problem occurred when a user submitted a search string falling between the first and last values of adjacent rows of the page definition table. A search string of "grant," for instance, would fall between rows 7 and 8 of the page definition table shown in Table 1. This would cause the search to fail, and no data would be returned to the user.

Another problem was that any insertion of new data required regenerating both of the tables. Furthermore, because of the structure of Table 2, PAGEDATA fields had to be defined before generation of the table. Changing the fields returned from a search required regeneration of the entire PAGEDATA table. A related problem was that such generation required very significant amounts of time when dealing with a database of any size. In a sample application, regeneration required over six hours of computing time.

Another problem with the prior art scheme was that the "closest" match to the user-specified search string (which was selected and highlighted for the user) would show up in search results at unpredictable offsets from the beginning of the returned data. To enhance usability, it would be more desirable to locate this data in a more predictable location, such as at the beginning of the search results or at approximately the middle of the search results.

The inventors have found an improvement over the prior art methods described above, allowing users to submit queries and to receive small groups of data in a sorted format, where the closest match is approximately centered within the returned results. The invention also allows the user to easily browse from one group of values to adjacent groups. Even with these desirable features, data can be added to the database without requiring the regeneration of any tables. Furthermore, searching is very efficient, and the server is not required to store state information for users.

SUMMARY OF THE INVENTION

In accordance with the invention, a user submits a search value to a server or service provider. The search value is the user's best guess regarding the data that is sought. Wildcards are not required to be entered by users.

The server maintains a database in a conventional format. The database has a plurality of records, each including a plurality of fields. At least one field of each record is a key field, used to search the records of the database. Standard queries can be performed against the database using specified key values.

The server also maintains a plurality of page definitions in a page table. Each page definition defines a page of database records in terms of lower and upper key values. In one embodiment, each page definition indicates a single pair of lower and upper key values. In response to receiving a search value, the server examines the page definitions to find one having key values that surround the search value. It then uses these key values to search the database, and to find all records whose key values fall between the key values of the page definition.

In contrast to the prior art, the upper and lower key values of the page definitions do not specify the first and last key values of the database records that are to be returned to the user. Rather, the lower key value specifies the key value of the first database record to be returned, while the upper key value specifies the key value of the first database record of a subsequent page of records.

In another embodiment, each page definition has two pairs of key values: a first pair that is used to identify the page definition corresponding to a search value, and a second pair that is used to query the database once the correct page definition has been found. Using this embodiment, the information returned to the user does not need to correspond in range to the index scheme used to identify page definitions. This allows the set returned to the client to be more configurable. Typically, the first pair defines a range of key values that is a subset of the range defined by the second pair.

DETAILED DESCRIPTION

Figure 1:
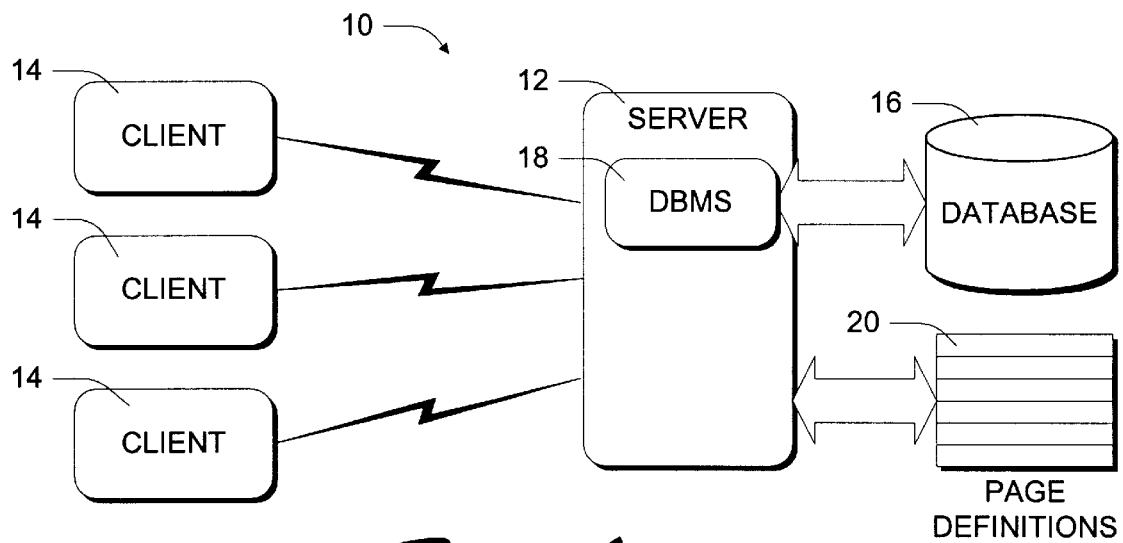
FIG. 1 is a block diagram of an information retrieval system in accordance with the invention.

FIG. 1 shows an information retrieval computer system in accordance with one embodiment of the invention, generally designated by reference numeral 10. Information retrieval system 10 includes a server 12 and a plurality of clients 14. Communications between the clients and the server is provided through a data communications network such as a local-area network, a wide-area network, or a public network such as the Internet.

Server 12 has or has access to one or more data storage media such as hard disks or hard disk arrays. The server maintains a database 16 on one of these hard disks. The database is formatted and arranged in a conventional format, having a plurality of database records. Each record has a plurality of fields containing variable data. The records can be searched and or sorted based on values contained in one or more key fields. Values in key fields are referred to herein as key values. The server has a database management system (DBMS) 18 for manipulating the database. Queries can be submitted to the DBMS in SQL (standard query language) format or a similar language that allows access to a relational database.

Figure 2:
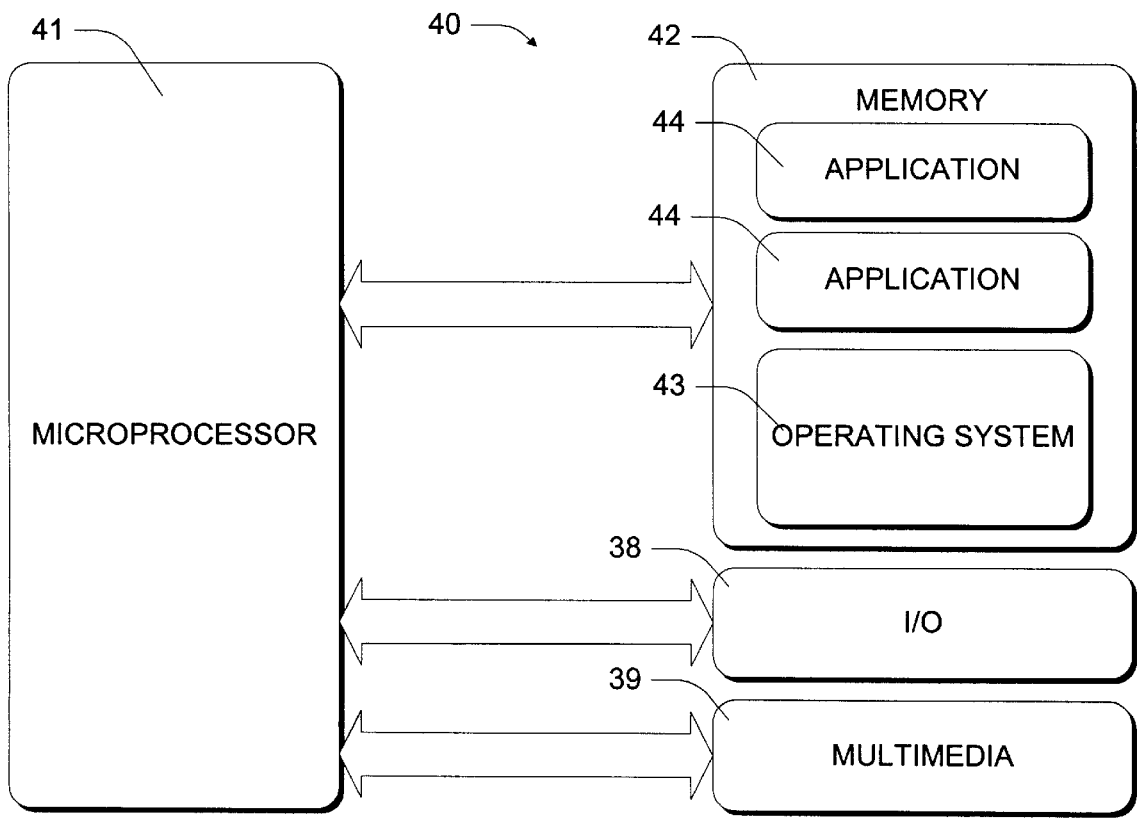
FIG. 2 is a block diagram showing pertinent components of a client or server computer in accordance with the invention.

FIG. 2 shows pertinent hardware components of an example client computer generally referenced by numeral 40. Computer 40 can be any one of a variety of different types of devices including consumer appliances such as set-top boxes, hand-held or pocket computers, Internet terminals, desktop computers, and laptop or notebook computers. A server computer is configured similarly to the configuration of FIG. 2, although it is optimized for server functions such as file access, application sharing, and database access.

Computer 40 includes a microprocessor 41 and a computer-readable storage medium such as electronic memory 42. Processor 40 is a conventional, off-the-shelf microprocessor such as an x86 series microprocessor, manufactured by Intel Corporation of Santa Clara, Calif. Although FIG. 2 shows only a single processor, the system might include a plurality of processors, used by a plurality of different processes or tasks, each having one or more execution threads. Computer system 40 also includes other typical computer hardware, such as I/O component 38 including interface electronics, as well as multimedia rendering devices 39 such as audio and video components.

Physical memory 42 preferably comprises randomly accessible read/write electronic memory (RAM), as well as secondary storage such as a magnetic hard disk or other data recording media. Memory 42 might also include other types of computer-readable storage media on which executable components are distributed and stored, including floppy disks, CD-ROMs, and non-volatile electronic memory such as EPROMs. Database 16 can be stored in memory 42, or in other disk-based memory that is accessible only through network resources.

In accordance with conventional computer systems, computer system 40 includes an operating system 43 and one or more application programs 44 that execute in conjunction with the operating system. The Windows 95® operating system, available from Microsoft Corporation of Redmond, Wash., is an example of an operating system suited for use in a client computer. Microsoft's Windows NT® operating system is an example of an operating system suitable for a server computer.

A plurality of application programs typically execute from memory 42. At a client, active application programs include an Internet browser such as Microsoft's Internet Explorer™. At the server, active applications include a database management system such as SQL*Server, Oracle, and Internet Information Server.

Referring again to FIG. 1, the invention includes a method of finding data in the server-maintained database 16. In general, one of clients 14 submits a search value to server 12. The search value is of the information type contained in one of the key fields of database records. The server is responsive to the submission of the search value to identify and return data from a limited set of database records which are likely to most closely match the submitted search value. Such a set of database records is referred to as a page of database records, and the data return from this record page is referred to as a data page.

To identify a single record page in response to a search value, the server maintains and references a plurality of page definitions. Each page definition indicates at least one pair of key values. When given a particular search value, the server performs a step of identifying one of the page definitions that corresponds to the search value. The server then searches the database to find a page or set of database records whose key values are bounded by the key values indicated by the identified page definition. Data from these records is then returned to the client as a data page. The records are optionally sorted before they are returned to the user. For instance, names might be sorted alphabetically before returning them to the user.

The page definitions are preferably stored in a searchable table on a storage media accessible by the server and serviced by the DBMS and referred to herein as a page definition table. Such a table is designated by reference numeral 20 in FIG. 1. The page definition table has a plurality of individual entries or rows. Each entry contains a pair of key values: a LOWER key value and an UPPER key value. In this embodiment of the invention, these key values are used as both index key values and as bounding key values. The difference between these types of key values will become apparent in the discussion below relating to a second embodiment of the invention.

Table 3 below illustrates an example of a page definition table that corresponds to the example database used in the discussion above:

TABLE 3

| LOWER | UPPER |
|---|---|
| a | Beaver |
| Beaver | Bratsanos |
| Bratsanos | Cheng |
| Cheng | De Donato |
| De Donato | Dulfer |
| Dulfer | Fang |
| Fang | Francoeur |
| Francoeur | Gui |
| Gui | Hersey |
| Hersey | Kearney |
| Kearney | Lee |
| Lee | Lyons |
| Lyons | McMahon |
| McMahon | Moffit |
| Moffit | O'Conner |

TABLE 3-continued

| LOWER | UPPER |
| --- | --- |
| O'Conner | Prets |
| Prets | Roberts |
| Roberts | St. Clair |
| St. Clair | Troupe |
| Troupe | Watson |
| Watson | ZZZZZZZ |

Each entry of the page definition table corresponds to a set of database records having key values that are bounded by the LOWER and UPPER key values of the entry. More specifically, a single set of database records corresponding to a particular entry of the page definition table comprises all records having a key values that are (a) equal to or greater than the LOWER key value of the entry and (b) less than the UPPER key value of the entry.

In the example Table 3 above, the first entry has a LOWER key value of "a" because "a" is the lexicographically first possible key value in this system (this value will differ depending on the type of data). It has an UPPER key value of "Beaver." A set of database records corresponding to this entry thus includes all names prior to Beaver in an alphabetical list. A set of database records corresponding to the second entry includes all names in the range between "Beaver" and "Bowman" ("Bowman" is the name in the database that precedes "Bratsanos"). Generally, the LOWER key value for the first entry is a value that is equal to or less than any possible search value. The UPPER key value for the last entry of the table is a value that is equal to or greater than any possible search value (again, this value will differ depending on the type of data contained in the database).

The page definition table is defined based on a desired size and division of information. With alphabetical information, it might be desired to have a single page of information for each letter of the alphabet, which would eliminate the need for the page definition table. However, it will often be desired to have coarser or finer divisions, so that an appropriate or approximately equal amount of data will correspond to each page table entry. This is especially true for large data sets. Good examples of simple page definition tables are the tabs of dictionaries or address books (A–B XYZ etc).

Note that this table is different than the table shown above in Table 1. Table 3, for example, does not specify an ID number. Just the LOWER and UPPER key values are specified. In addition, the UPPER key value of each row is the same as the LOWER value for the next row. This prevents certain search values from falling between table entries—any possible and allowed search value will fall within the key values of one of the entries.

When a client submits a search value as part of a request for data, the server searches the page definition table to identify a row or entry that corresponds to the search value. Specifically, the server finds the entry having LOWER and UPPER key values that surround the search value. Even more specifically, the server finds the single entry for which it is true that (a) the search value is equal to or greater than the LOWER key value of the entry and (b) the search value is strictly less than the UPPER key value of the entry.

Once such an entry is found, its key values are used as bounding values to identify the corresponding set of database records. Specifically, the server performs a search or query of the database to identify the set of database records whose key values are bounded by the key values of the identified table entry. This set comprises all records having a key values that are (a) equal to or greater than the LOWER key value of the entry and (b) less than the UPPER key value of the entry. Data from these records is returned as a response to the client's request for data.

Although the page definition table lists key values, the database will in most cases have a plurality of fields other than the key fields. The values returned to the client are not necessarily the key values from the identified set of database records. Rather, any group of field values can be returned from the set of database records once the appropriate set of database records is identified. In most cases, however, the group of field values returned for each record will include values from the key field.

In addition to returning the desired data, the server returns the LOWER and UPPER key values that were used to identify the set of database records. This state information is then stored by the client, and used by the client to formulate subsequent queries or requests for finding additional sets or pages of database records that neighbor the set that was initially found. This allows browsing among pages of database information based on state information maintained by the client—no server resources are consumed in order to maintain the state information. Additionally, if there are many records that fall into a range (say works that start with Beethoven includes 1000 entries in a music database and sets of 100 are returned), this technique allows the system to perform well while still allowing the user to browse the data.

Note that there is preferably some preprocessing of search values. For example, all values are converted to lowercase and leading spaces are removed. Key words such as "The" or "A" are also removed. Note that the original data might have a "key" value for certain fields. For example, if the original data was "The Beatles", it might contain an additional column "beatles, the" which is used for searching. In this example, the search key data might not be returned, but the original "actual" data would be returned instead. Values in the page definition table are processed in the same way.

Figure 3:
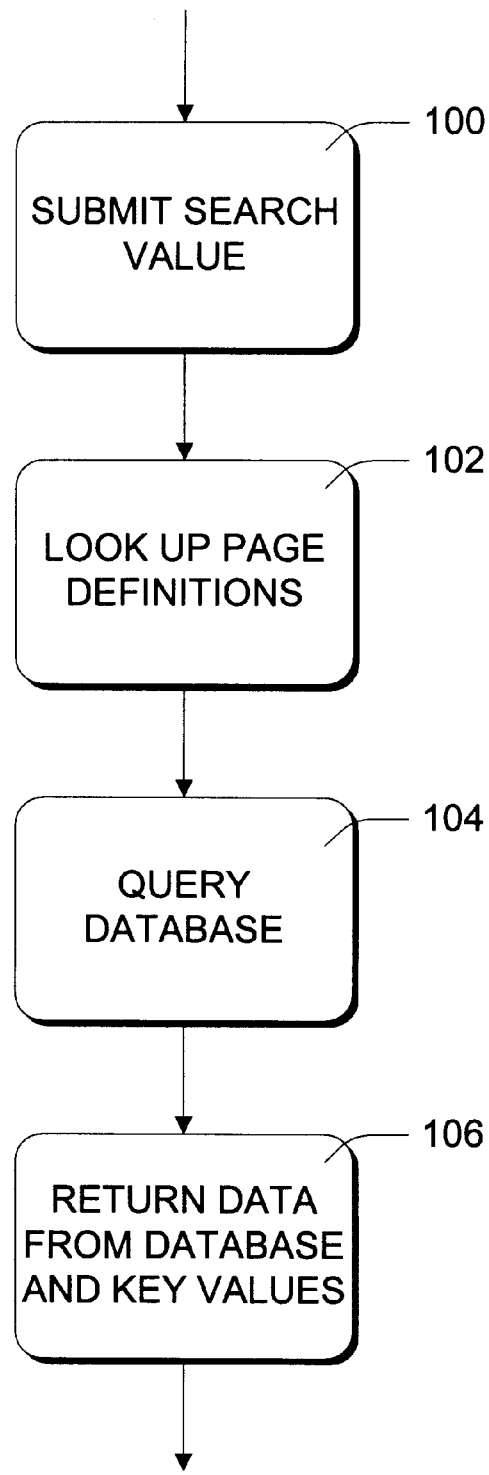
FIG. 3 is a flowchart showing preferred steps in accordance with the invention.

FIG. 3 illustrates preferred steps in accordance with the invention. A step 100 comprises submitting a search value from a server to a client. The search value corresponds to a key field in a database maintained by the server. In response to submission of the search value, the server performs a step 102 of referencing a plurality of page definitions to identify one of the page definitions that corresponds to the supplied search value. As already described, each page definition indicates a pair of key values, wherein each pair includes an UPPER key value and a LOWER key value. The page definitions are preferably stored as entries in a table. When this is the case, step 102 comprises searching for a table entry whose pair of key values surrounds the supplied search value—where the search value falls between a range defined by the LOWER and UPPER key values, inclusive of the LOWER key value.

A step 104 comprises searching the database to find a set of database records whose key values are bounded by the key values of the page definition identified in step 102. Specifically, this step is formulated to return all records having key values between the LOWER and UPPER key values of the identified page definition, inclusive of the LOWER key value.

A step 106 comprises returning data from the identified set of database records to the client. This step includes returning the key values from the page definition identified in step 102. The client can derive new search values based on the returned key values. Such new search values are submitted to the server in order to browse through different page of database records.

This scheme is a great improvement over the prior art schemes discussed above. The most significant advantage is that no table regeneration is needed when adding records to the database. Although adding records to the database might eventually result in record pages having differing numbers of records, this is not a significant concern. In a large database, the relative sizes will remain about equal, subject only to small statistical variations. At some point, it might be desired to regenerate or recalculate the page definition table in order to set all record pages to an approximately equal size. However, this is a relatively small task—especially in comparison to the task of regenerating a page data table as was required in the prior art. Additionally, when defining or regenerating the page definition table, a random sampling of database records can be used to define record sets of equal sizes. This further reduces the time required for regeneration. More importantly, a page data table is not required. Rather, reference to the database itself is made using this technique after lower and upper bounds have been identified from the page definition table. Note that searches can be based on different database fields by maintaining multiple page definition tables. This would have required multiple page data tables in the prior art.

Searches using this scheme are quick and efficient, requiring only a simple indexed lookup in the page definition table and a subsequent indexed query in the database. Example queries using "fle" as a search value would appear as follows in SQL format:

select LOWER, UPPER from page_definition_table where LOWER≦'FLE' and UPPER>'FLE' select name, address from database_table where key_value≧'FANG' and key_value<'FRANCEOUR' where key_value refers to a database field containing key values for each record, and database_table refers to an appropriate table in the existing database. Appropriate checks for "boundary" conditions are achieved by checking for the query returning no rows.

Note that the latter of the two preceding query statements can return any data contained in the database records, without requiring regeneration of any tables. There is no need to predefine the returned fields, as is the case in the prior art. In this case, the query is formulated to return a full name and address for each record in the selected page of database records.

These queries can be formulated and submitted by the server, or they can be formulated and submitted directly from a client. In the preferred embodiment, the queries are performed by the server, and data is returned in HTML format.

Another important characteristic of the invention is that it allows browsing from one data page to adjacent data pages, using state information that is maintained by the client rather than the server. This is because the key values used to formulate the query of the database are provided to the client. In the example above, for instance, the key values "Fang" and "Francoer" would have been returned. To browse to a previous set or page of data, the client would submit a new search based on one of these values. For example, new UPPER and LOWER values for a previous page of database records are found by executing a query of the form:

select LOWER, UPPER from page_definition_table where UPPER=previous_lower

UPPER and LOWER key values for a subsequent page of database records are found as follows:

select LOWER, UPPER from page_definition_table where LOWER=previous_upper

Another problem addressed by the invention relates to the convenient presentation of returned data to the user. When the client is searching for a specific record, that record will generally be positioned randomly in the returned and sorted data. It could be at the beginning of the returned records, at the end of the returned records, or in the middle. If desired, however, the page definition table can be split into smaller entries, so that each data page is relatively small. Then, a plurality of data pages can be returned to the client, with the data page corresponding to the search value being positioned arbitrarily within the returned pages. Using this method, the closest matches to the search value can be positioned consistently near the beginning, near the middle, or near the end of the returned data, although typically it would be desired to display the data near the beginning. For example, once a targeted data page is determined, that data page and the following data page could be returned. For further user convenience, it is also desirable to highlight the closest match to the user-specified key value.

As an enhancement to the scheme already described, the page definitions can be configured to include two pairs of key values: a pair of index key values and a pair of bounding key values. The index key values are used to find the page definition corresponding to the search value, and the bounding key values are used to define the bounds of database records to be returned to the client. In this way, the range of returned records can be extended beyond that which would otherwise be returned using the scheme described above. This alternative scheme can also be used to position the closest matching records near arbitrary location in the returned data, such as near the beginning, middle, or end.

Table 4 below illustrates a page definition table in accordance with this alternative embodiment of the invention:

TABLE 5

| INDEX LOWER | INDEX UPPER | BOUNDING LOWER | BOUNDING UPPER |
|---|---|---|---|
| a | Beaver | a | Beckett |
| Beaver | Bratsanos | Barnes | Browns |
| Bratsanos | Cheng | Borgman | Conway |
| Cheng | De Donato | Caudill | DeBroeck |
| De Donato | Dulfer | Davis | Dunkelberger |
| Dulfer | Fang | Driscoll | Ferguson |
| Fang | Francoeur | Evans | Funaro |
| Francoeur | Gui | Flowers | Gwertzman |
| Gui | Hersey | Gower | Honeycutt |
| Hersey | Kearney | Heflin | Kelnhofer |
| Kearney | Lee | Jones | Lim |
| Lee | Lyons | Lalonde | Maes |
| Lyons | McMahon | Ludden | McCrory |
| McMahon | Moffit | Maumas | Moncure |
| Moffit | O'Conner | Milford | Oker |
| O'Conner | Prets | Naroski | Raines |
| Prets | Roberts | Planondon | Rodriquez |
| Roberts | St. Clair | Richardson | Sturm |
| St. Clair | Troupe | Slonsky | Tutt |
| Troupe | Watson | Timoney | Webb |
| Watson | ZZZZZZZ | Walker | ZZZZZZZ |

Each page definition table entry includes both a pair of index key values and a pair of bounding key values. The index key values are used when identifying which table entry corresponds to a search value. Specifically, the entry whose LOWER index key value is equal to or less than the search value and whose UPPER index key value is greater than the search value is the entry that corresponds to the search value.

The index key values are configured exactly as in Table 3: the pairs form an ordered sequence, wherein the UPPER key value of a particular pair is the same as the LOWER key value of a subsequent pair. This prevents search values from falling between pairs of index key values.

The bounding key values are used when querying the database for a set of records. Once a table entry is identified, the database is queried for all records whose key values fall between the bounding entries of the identified table entry.

When using this scheme, the bounding values of a particular table entry preferably span the index entries of the same entry. Consider, for example, the third entry in Table 4. The index key values are "Bratsanos" and "Cheng." Search values between these values (inclusive of "Bratsanos") will result in this table entry being selected. However, the data returned will correspond to all database records whose key values are between "Borgrnan" and "Conway." Thus, the bounding range is larger than the index range for any particular entry. In some cases, the bounding key values for a particular entry might be identical to the index key values for the entry. This special case is actually implemented by the previous example of Table 3; where the index key values and the bounding key values are equal to each other, only one pair of values needs to be listed in the page definition table.

Using this method data that most closely matches the search value can be biased toward one portion of the search results. For example, if the LOWER bounding key value is equal to the LOWER index key value and the UPPER bounding key value is much greater than the UPPER index key value, the closest matches will be biased toward the beginning of the returned data.

When returning data, either the bounding keys, the index keys, or both are returned to the client. The client can then submit a new search criterion to the server, based on these values, to browse to a different set of database records as described above. Preferably, returned index key values are used to formulate a new search query.

This enhancement is useful for controlling the data set returned to the client in relation to the key value specified by the client. There are also other advantages. First, the server can control the position of the searched word in the data returned to the client. If it is desired for the key value (or its closest match) to be the first record returned, earlier records can simply be omitted from the returned search results. In other words, the earlier records can be "truncated" off of the results of the second query before returning them to the client. In order to do this, selecting the "previous" records must return those records that were truncated off. So the first request for a previous set of records would probably not return the previous set, but rather the original untruncated first set. This can be achieved with a single flag of state stored by the client and passed back into the server. Second, browsing can be enhanced by overlapping the data sets, so there is some context while viewing the next or previous sets.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of finding data in a database based upon a supplied search value, the database having a plurality of records that can be searched based on key values, the method comprising:

referencing a plurality of page definitions to identify a pair of key values that surround the supplied search value;

searching the database to find a set of database records whose key values are bounded by the identified pair of key values; and storing the page definitions in a searchable table having a plurality of entries, each entry including a pair of key values, each such pair including a lower key value and an upper key value corresponding, to a particular set of database records, wherein the upper key value of a given entry is the same as the lower key value of a different entry.

2. A method as recited in claim 1, comprising an additional step of finding additional sets of database records that neighbor the set found in the searching step.

3. A computer-readable storage medium having instructions for finding data in a database based upon a supplied search value, the database having a plurality of records that can be searched based on key values, the instructions being executable to perform acts comprising:

storing a page definition table that has a plurality of entries, each entry corresponding to a set of database entries, wherein each entry indicates a respective first pair of key values;

searching the page definition table to identify an entry that corresponds to the supplied search value;

searching the database to find a set of database records whose key values are bounded by the first pair of key values indicated by the identified entry of the page definition table;

wherein searching the page definition table comprises searching for a table entry whose first pair of key values surrounds the supplied search value;

wherein each respective first pair of key values comprises a lower key value and an upper key value; and wherein the upper key value indicated by a given entry of the page definition table is the same as the lower key value of a different entry of the page definition table.

4. A computer-readable storage medium having instructions for finding data in a database based upon a supplied search value, the database having a plurality of records that can be searched based on key values, the instructions being executable to perform the following steps:

storing a page definition table that has a plurality of entries, each entry corresponding to a set of database entries, wherein each entry indicates a respective first pair of key values;

searching the page definition table to identify an entry that corresponds to the supplied search value;

searching the database to find a set of database records whose key values are bounded by the first pair of key values indicated by the identified entry of the page definition table;

wherein each entry of the page definition table additionally indicates a second pair of key values;

if wherein the searching step comprises searching for a table entry whose second pair of key values surrounds the search value;

wherein each respective second pair of key values comprises a lower key value and an upper key value; and wherein the upper key value indicated by a given entry of the page definition table is the same as the lower key value of a different entry of the page definition table.

5. A computer-readable storage medium as recited in claim 3, containing further instructions for performing an additional step comprising finding additional sets of database records that neighbor the set of database records found in the searching step.

6. An information retrieval system comprising:

one or more data storage media;

a database maintained on said one or more data storage media, the database having a plurality of records that can be searched based on key values;

a page definition table maintained on said one or more data storage media, the page definition table having a plurality of entries indicating pairs of index key values and pairs of bounding key values;

wherein each pair of bounding keys defines a set of database records having key values that are bounded by the pair of bounding keys; and wherein the pairs of index key values form an ordered sequence of such pairs, each pair of index key values comprising a lower key value and an upper key value, wherein the lower key value of a particular pair is the same as the upper key value of the subsequent pair.

7. An information retrieval system as recited in claim 6, wherein an individual entry of the page definition table indicates bounding key values that are identical to the index key values indicated by said individual entry.

8. An information retrieval system as recited in claim 6, wherein an individual entry of the page definition table indicates bounding key values that span the index key values indicated by said individual entry.

9. An information retrieval system comprising:

a server having access to one or more data storage media;

a database maintained on said one or more data storage media, the database having a plurality of records that can be searched based on key values;

a page definition table maintained on said one or more data storage media, the page definition table having a plurality of entries indicating pairs of index key value and pairs of bounding key values;

a client that submits a search value to the server;

the server being responsive to submission of a search value to identify an entry from the page definition table whose index values surround the supplied search value; to identify a set of database records whose key values are bounded by the pair of bounding key values of the identified entry; and to return data from the identified set of database records to the client; and wherein the pairs of index key values form an ordered sequence of such pairs, each pair of index key values comprising a lower key value and an upper key value, wherein the lower key value of a particular pair is the same as the upper key value of the subsequent pair.

10. An information retrieval system as recited in claim 9, wherein the server is further responsive to submission of the search value to identify additional neighboring sets of database records and to return data from such additional sets of database records to the client.

11. An information retrieval system as recited in claim 9, wherein an individual entry of the page definition table indicates bounding key values that are identical to the index key values indicated by said individual entry.

12. An information retrieval system as recited in claim 9, wherein an individual entry of the page definition table indicates bounding key values that span the index key values indicated by said individual entry.

13. An information retrieval system as recited in claim 9, wherein the server returns the index key values to the client along with the data from the identified set of database records.

14. An information retrieval system as recited in claim 9, wherein the server returns the bounding key values to the client along with the data from the defined set of database records.

15. An information retrieval system as recited in claim 9, wherein:

the server returns the index key values to the client along with the data from the identified set of database records; and the client submits a new search criteria to the server to browse to a different set of database records, wherein the new search criteria is derived from the returned index values.

16. An information retrieval system as recited in claim 9, wherein:

the server returns the index key values to the client along with the data from the identified set of database records;

the client derives a new search value based on the returned index key values; and the client submits the new search value to the server to browse to a different set of database records.

* * * * *